(12) United States Patent
Yamada et al.

(10) Patent No.: US 6,729,435 B2
(45) Date of Patent: May 4, 2004

(54) APPARATUS AND METHOD FOR CONTROLLING ELECTRIC POWER STEERING SYSTEM

(75) Inventors: Yasushi Yamada, Kariya (JP); Masahide Iwazawa, Kariya (JP); Kiyotaka Iwata, Kariya (JP); Akira Itoh, Kariya (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 10/318,155

(22) Filed: Dec. 13, 2002

(65) Prior Publication Data

US 2003/0121716 A1 Jul. 3, 2003

(30) Foreign Application Priority Data

Dec. 13, 2001 (JP) ........................................ 2001-380303

(51) Int. Cl.[7] .................................................. B62D 5/04
(52) U.S. Cl. ...................................................... 180/446
(58) Field of Search .............................. 180/443, 446, 180/404

(56) References Cited

U.S. PATENT DOCUMENTS

2002/0024317 A1 * 2/2002 Amakusa et al. ............ 318/782
2003/0130777 A1 * 7/2003 Iwazawa ....................... 701/41
2003/0155879 A1 * 8/2003 Kifuku et al. ............... 318/432

* cited by examiner

Primary Examiner—Kevin Hurley
(74) Attorney, Agent, or Firm—Oblon, Spivak, McClelland, Maier & Neustadt, P.C.

(57) ABSTRACT

A control apparatus of an electric power steering system has first to fourth calculators and an abnormality detector. The first calculator calculates an assist current command value, which corresponds to assist force for reducing steering force of the steering wheel, based on the steering torque of the steering wheel. The second to fourth calculators calculate a compensation current command value, which corresponds to compensation force for compensating for movement of the steering wheel, based on the angular velocity of the steering wheel that has been estimated based on the terminal-to-terminal voltage of the motor. The abnormality detector detects an abnormality of the terminal voltages of the motor. When the abnormality detector detects an abnormality, the second to fourth calculators substitute zero for the steering wheel angular velocity and then calculates the compensation current command value.

18 Claims, 4 Drawing Sheets

APPARATUS AND METHOD FOR CONTROLLING ELECTRIC POWER STEERING SYSTEM

BACKGROUND OF THE INVENTION

The present invention relates to an apparatus and a method for controlling an electric power steering system used in vehicles such as automobiles.

An electric power steering system uses an electric motor to assist movement of a steering wheel. The electric motor generates assist force for reducing steering force of the steering wheel and compensation force for compensating for the movement of the steering wheel.

When the vehicle is driving, if the steering wheel is released after being rotated, the self-aligning torque, which is applied to the tires from the road surface, returns the steering wheel to the neutral position. When the steering wheel is automatically returned to the neutral position, the electric motor receives inertial force. The inertial force adversely affects the returning of the steering wheel to the neutral position. Specifically, when the vehicle is driving at a low speed, the inertial force delays the returning of the steering wheel. When the vehicle is driving at a high speed, the inertial force generates a vibration, which causes the steering wheel to pass the neutral position.

To eliminate such drawbacks when the steering wheel is automatically returned to the neutral position, the electric motor generates the compensation force for assisting the steering wheel to return to the neutral position when the vehicle is driving at a low speed. While the vehicle is driving at a high speed, the electric motor generates the compensation force to improve the convergence of the steering wheel to the neutral position when the steering wheel automatically returns to the neutral position. Further, the electric motor generates the compensation force to compensate the load generated due to friction in the transmission path of the steering force between the steering wheel and the steered vehicle wheels.

The electric motor is controlled by a control value outputted by a control apparatus.

The control value is calculated by the control apparatus based on a current command value, which is a control target value, and a driving current that actually flows through the electric motor. An assist current command value, which is a target value related to the assist force, is calculated by the control apparatus based on the steering torque of the steering wheel. On the other hand, a compensation current command value, which is a target value related to the compensation force, is calculated by the control apparatus based on the steering wheel angular velocity. The steering wheel angular velocity is estimated based on the terminal-to-terminal voltage of the electric motor.

The control apparatus always keeps determining whether there is an abnormality in the terminal-to-terminal voltage of the electric motor. Conventionally, the control apparatus conventionally discontinues outputting control values when an abnormality is detected in the terminal-to-terminal voltage. If the compensation current command value is computed based on abnormal terminal-to-terminal voltage, the control values may be invalid. The control apparatus stops the output of the control value to prevent invalid control values from being outputted. Control of the electric motor with invalid control values causes various drawbacks such as different steering feelings when the steering wheel is rotated leftward and rightward, and an unstable operation of the steering wheel when the vehicle is driving at a high speed. However, if the output of the control values is stopped, the generation of the assist force is discontinued, which, in turn, requires a greater force to manipulate the steering wheel on the part of the driver.

SUMMARY OF THE INVENTION

Accordingly, it is an objective of the present invention to provide an apparatus and method for controlling an electric power steering system, which apparatus and method prevent the steering feeling from being degraded when there is an abnormality in the terminal-to-terminal voltage of a motor, while continuing the generation of assist force with the motor.

To achieve the above objective, the present invention provides a control apparatus of an electric power steering system located between a steering wheel and a steered vehicle wheel. The electric power steering system includes a motor. The motor generates assist force for reducing steering force of the steering wheel and compensation force for compensating for movement of the steering wheel. The apparatus includes first calculation means, second calculation means, control means, and detection means. The first calculation means calculates an assist current command value that corresponds to the assist force based on the steering torque of the steering wheel. The second calculation means estimates the angular velocity of the steering wheel based on a terminal-to-terminal voltage of the motor and calculates a compensation current command value that corresponds to the compensation force based on the estimated steering wheel angular velocity. The control means controls the motor based on the sum of the assist current command value and the compensation current command value. The detection means detects an abnormality of a terminal voltage of the motor. When an abnormality of the terminal voltage is detected, the second calculation means substitutes a predetermined fixed value for the steering wheel angular velocity and then calculates the compensation current command value.

The present invention further provides a control method of an electric power steering system located between a steering wheel and a steered vehicle wheel. The electric power steering system includes a motor. The motor generates assist force for reducing steering force of the steering wheel and compensation force for compensating for movement of the steering wheel. The method includes: calculating an assist current command value that corresponds to the assist force based on the steering torque of the steering wheel; estimating the angular velocity of the steering wheel based on a terminal-to-terminal voltage of the motor, and calculating a compensation current command value that corresponds to the compensation force based on the estimated steering wheel angular velocity; controlling the motor based on the sum of the assist current command value and the compensation current command value; detecting an abnormality of a terminal voltage of the motor; and substituting a predetermined fixed value for the steering wheel angular velocity when an abnormality of the terminal voltage is detected.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described with reference to FIGS. 1 to 4.

Figure 1:
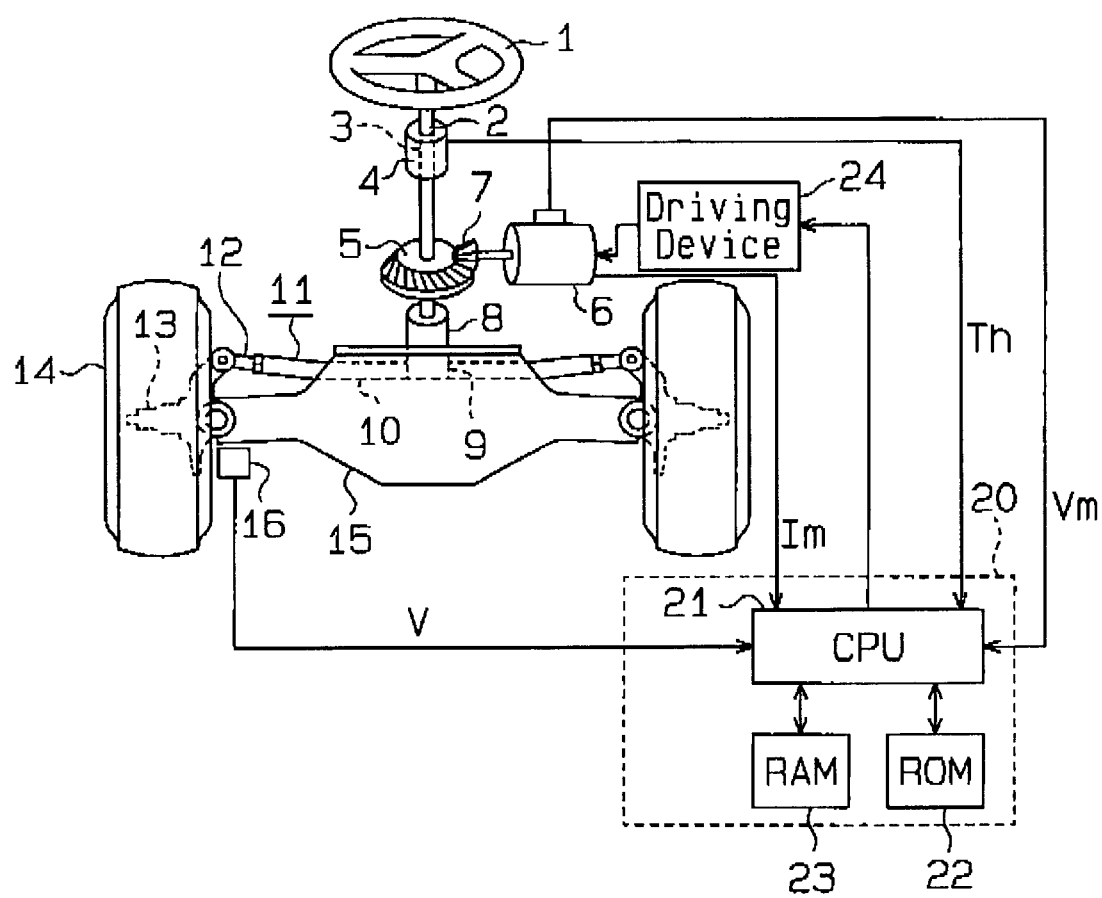
FIG. 1 is a diagrammatic view showing an electric power steering system according to one embodiment of the present invention.

As shown in FIG. 1, an electric power steering system is located between a steering wheel 1 and steered vehicle wheels, which are front wheels 14 in this embodiment. The electric power steering system includes a steering mechanism having an electric motor 6, a driving device 24 for driving the electric motor 6, and a control apparatus 20 for controlling the driving device 24.

The steering mechanism couples the steering wheel 1 with the front wheels 14. Other than the electric motor 6, the steering mechanism includes a steering shaft 2, a reduction gear 5, a gear 7, a pinion shaft 8, a rack-and-pinion mechanism 11, a pair of tie rods 12, and a pair of knuckles 13.

The steering shaft 2 extends from the steering wheel 1 and is coupled to the reduction gear 5. The reduction gear 5 is meshed with the gear 7 attached to the rotary shaft of the electric motor 6. The reduction gear 5 is coupled to the rack-and-pinion mechanism 11 with the pinion shaft 8. The rack-and-pinion mechanism 11 has a pinion 9 and a rack 10, which is engaged with the pinion 9. Each end of the rack 10 is coupled to one of the tie rods 12 The distal end of each tie rod 12 is coupled to one of the knuckles 13, which is pivotally supported. Each front wheel 14 is attached to one of the knuckles 13. The knuckles 13 are pivotally coupled to a cross member 15.

Rotation of the steering wheel 1 is transmitted-to the rack-and-pinion mechanism 11 through the steering shaft 2 and the pinion shaft 8. As a result, the front wheels 14 are pivoted together with the knuckles 13 relative to the cross member 15. At this time, rotation of the electric motor 6 is transmitted to the pinion shaft 8 through the reduction gear to reduce the steering force of the steering wheel 1.

Figure 2:
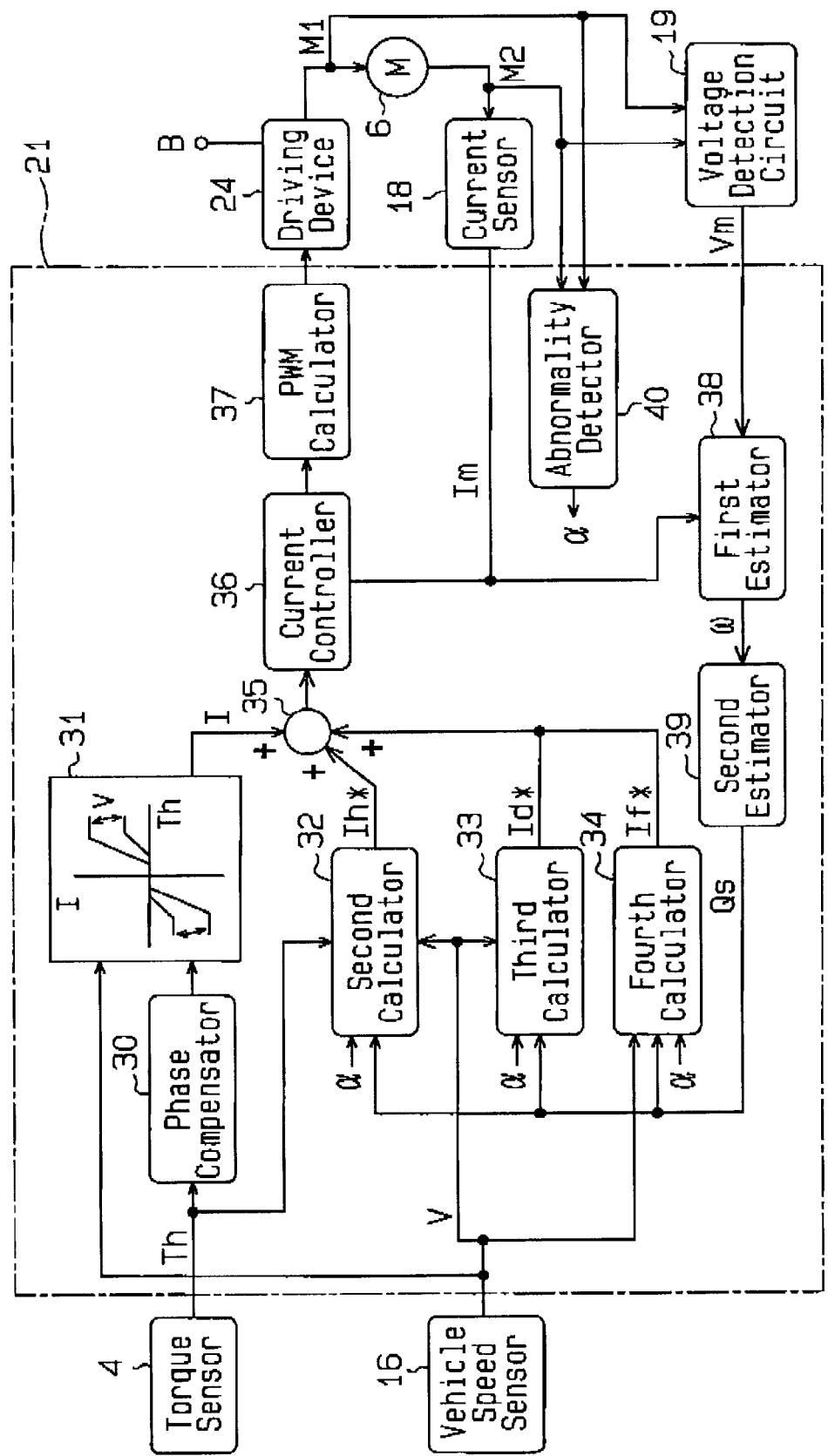
FIG. 2 is a block diagram for showing functions of a CPU in the control apparatus of the electric power steering system shown in FIG. 1.

The control apparatus 20 is electrically connected to a torque sensor 4, a vehicle speed sensor 16, a current sensor 18 (see FIG. 2), and a voltage detection circuit 19 (see FIG. 2). The torque sensor 4 is attached a torsion bar 3 provided on the steering shaft 2. The torque sensor 4 detects torsion of the torsion bar 3 due to rotation of the steering shaft 2, or detects the steering torque Th of the steering wheel 1. The vehicle speed sensor 16 is located in the vicinity of one of the front wheels 14 to detect the rotation speed of the front wheel 14, or the vehicle speed V. The current sensor 18 is attached to the electric motor 6 to detect a driving current Im supplied to the motor 6. The voltage detection circuit 19 is also attached to the electric motor 6 to detect a terminal-to-terminal voltage Vm of the motor 6. The torque sensor 4, the vehicle speed sensor 16, the current sensor 18, the voltage detection circuit 19 each output a signal representing the detected value to the control apparatus 20.

The control apparatus 20 includes a central processing unit (CPU) 21, a read only memory (ROM) 22, and a random access memory (RAM) 23. The ROM 22 stores various programs executed by the CPU 21 and maps used in the programs. The RAM 23 temporarily stores computation results of the CPU 21.

FIG. 2 is a block diagram for explaining functions of the CPU 21. The CPU 21 executes various functions in accordance with programs stored in the ROM 22. FIG. 2 shows functions of the CPU 21 with numerals.

As shown in FIG. 2, the torque sensor 4 outputs a signal that represents the steering torque Th to a first calculator 31 and a second calculator 32 through a phase compensator 30. The phase compensator 30 functions to increase the stability of the electric power steering system. The vehicle speed sensor 16 outputs a signal representing the vehicle speed V to the first calculator 31, the second calculator 32, a third calculator 33, and a fourth calculator 34. The current sensor 18 outputs a signal representing a first estimator 38 and a current controller 36. The voltage detection circuit 19 outputs a signal representing the terminal-to-terminal voltage Vm to the first estimator 38.

The first calculator 31 calculates an assist current command value I that corresponds to the steering torque Th and the vehicle speed V based on a map stored in the ROM 22. The first calculator 31 outputs a signal representing the assist current command value I to an adder 35. The assist current command value I is a target value related to the assist force for reducing the steering force of the steering wheel 1.

The first estimator 38 estimates a motor angular velocity ω according to the following equation based on the inputted motor driving current Im and the terminal-to-terminal voltage Vm, and sends a signal representing the motor angular velocity ω to the second estimator 39.

$$\omega = (Vm - (R + LS)Im)/Ke$$

In the equation, R represents the motor resistance, LS represents the motor inductance, Ke represents the counter electromotive force of the motor.

The second estimator 39 computes a steering wheel angular velocity Qs by dividing the motor angular velocity ω by the reduction ratio of the reduction gear 5; and sends a signal representing the steering wheel angular velocity Qs to the second calculator 32, the third calculator 33, and the fourth calculator 34.

In this embodiment, the first calculator 31 is first calculation means, and the second to fourth calculators 32 to 34 and the first and second estimator 38, 39 are second calculation means.

The second calculator 32 obtains a steering wheel return current Ih (return current Ih) that corresponds to the steering wheel angular velocity Qs from a map (steering wheel return current map) stored in the ROM 22. The second calculator 32 also obtains a steering wheel return gain Kh that corresponds to the vehicle speed V from another map (steering wheel return gain map) stored in the ROM 22. The second calculator 32 judges the operation state of the steering wheel 1 by referring to the steering torque Th based on a map (steering wheel return judgment map) stored in the ROM 22. Specifically, when the steering torque Th is equal to or less than a threshold value, it is determined that the steering wheel 1 in the process of automatically returning to the neutral position. If the steering wheel 1 is determined to be in the process of automatically returning to the neutral position, the second calculator 32 multiplies the return current Ih by the steering wheel return gain Kh to obtain the return current command value Ih*, and sends a signal representing the return current command value Ih* to the adder 35. The return current command value Ih* is a compensation current command value that is a control target value related to the compensation force for compensating for movement of the steering wheel 1. The return current command value Ih* is a target value of the steering wheel return force. The steering wheel return force is a type of the compensation force and assists the steering wheel 1 to automatically return to the neutral position when the vehicle is driving at a low speed.

The third calculator 33 obtains a damper current Id that corresponds to the steering wheel angular velocity Qs from a map (damper current map) stored in the ROM 22. The third calculator 33 also obtains a damper gain Kd that corresponds to the vehicle speed V from another map (damper gain map) stored in the ROM 22. The third calculator 33 multiplies the damper current Id by the damper gain Kd thereby obtaining the damper current command value Id*, and sends a signal representing the damper current command value Id* to the adder 35. The damper current command value Id* is a type of the compensation current command value and is a target value related to damper force. The damper force is a type of the compensation force and improves the convergence of the steering wheel 1 when the steering wheel 1 automatically returns to the neutral position while the vehicle is driving at a high speed.

The fourth calculator 34 obtains a friction compensation current If that corresponds to the steering wheel angular velocity Qs from a map (friction compensation current map) stored in the ROM 22. The fourth calculator 34 also reads a friction compensation gain Kf that corresponds to the vehicle speed V from another map (friction compensation gain map) stored in the ROM 22. The fourth calculator 34 multiplies the friction compensation current If by the friction compensation gain Kf thereby computing the friction compensation current command value If*, and sends a signal representing the friction compensation current command value If* to the adder 35. The friction compensation current command value If* is a type of the compensation current command value and is a target value related to friction compensation force. The friction compensation force is a type of the compensation force and compensates for the load generated due to friction in the transmission path of the steering force between the steering wheel 1 and the front wheels 14. The friction is, for example, the friction among the parts in the steering mechanism and the friction between the tires and the road surface.

The adder 35 computes the sum of the assist current command value I, the return current command value Ih*, the damper current command value Id*, and the friction compensation current command value If*, and sends a signal representing the sum to the current controller 36, which functions as control means. The current controller 36 executes proportional integral (PI) calculation or proportional integral and differential (PID) calculation based on the difference between the output signal of the adder 35 and the motor driving current Im. The current controller 36 then outputs a signal representing the calculation result to a pulse-width-modulation (PWM) calculator 37. The PWM calculator 37 executes PWM calculation based on the output signals of the current controller 36 and sends a signal representing the calculation results to the driving device 24. The driving device 24 drives the electric motor 6 based on the output signals of the PWM calculator 37.

The CPU 21 further includes an abnormality detector 40 for detecting an abnormality of terminal voltages M1, M2 of the electric motor 6. The abnormality detector 40 determines that there is an abnormality when the terminal voltages M1, M2 of the electric motor 6 satisfy first or second conditions discussed below. When determining that the terminal voltages M1, M2 are abnormal, the abnormality detector 40 sends an abnormality signal (abnormality flag) $\alpha$ to the second calculator 32, the third calculator 33, and the fourth calculator 34.

The first condition is satisfied when the sum of the terminal voltages M1 and M2 is less than a value computed by subtracting a predetermined value $\delta 1$ from the battery voltage B, and the terminal voltage M1 or M2 is less than a predetermined threshold value $\delta 2$ ($\delta 1 > \delta > 0$). The second condition is satisfied when the sum of the terminal voltages M1 and M2 is more than a value computed by adding the predetermined value $\delta 1$ to the battery voltage B, and the terminal voltage M1 or M2 is more than a predetermined threshold value $\delta 3$ ($\delta 3 > \delta 1 > 0$). The battery voltage B is the voltage applied to the electric motor 6 by a battery (not shown). Under normal operation conditions, the sum of the terminal voltages M1, M2 is equal to the battery voltage B.

When receiving the abnormality signal $\alpha$, the second calculator 32 reads zero from the steering wheel return current map and substitutes zero for the return current Ih. Thus, the return current command value Ih*, which is supplied to the adder 35 from the second calculator 32 is set to zero. In the steering wheel return current map of the this embodiment, the return current Ih is set to zero when the steering wheel angular velocity Qs is zero. Therefore, when receiving the abnormality signal $\alpha$, the second calculator 32 substitutes zero for the steering wheel angular velocity Qs, which is sent from the second estimator 39.

When receiving the abnormality signal $\alpha$, the third calculator 33 reads zero from the damper current map and substitutes zero for the damper current Id. Thus, the damper current command value Id*, which is supplied to the adder 35 from the third calculator 33, is zero. In the damper current map of this embodiment, the damper current Id is set to zero when the steering wheel angular velocity Qs is zero. Therefore, when receiving the abnormality signal $\alpha$, the third calculator 33 substitutes zero for the steering wheel angular velocity Qs, which is sent from the second estimator 39.

When receiving the abnormality signal $\alpha$, the fourth calculator 34 reads zero from the friction compensation current map and substitutes zero for the friction compensation current If. Thus, the friction compensation current value If*, which is supplied to the adder 35 from the fourth calculator 34, is zero. In the friction compensation current map of this embodiment, the friction compensation current If is set to zero when the steering wheel angular velocity Qs is zero. Therefore, when receiving the abnormality signal $\alpha$, the fourth calculator 34 substitutes zero for the steering wheel angular velocity Qs, which is sent from the second estimator 39.

The operation of the control apparatus 20 will now be described with reference to FIGS. 3 and 4.

Figure 3:
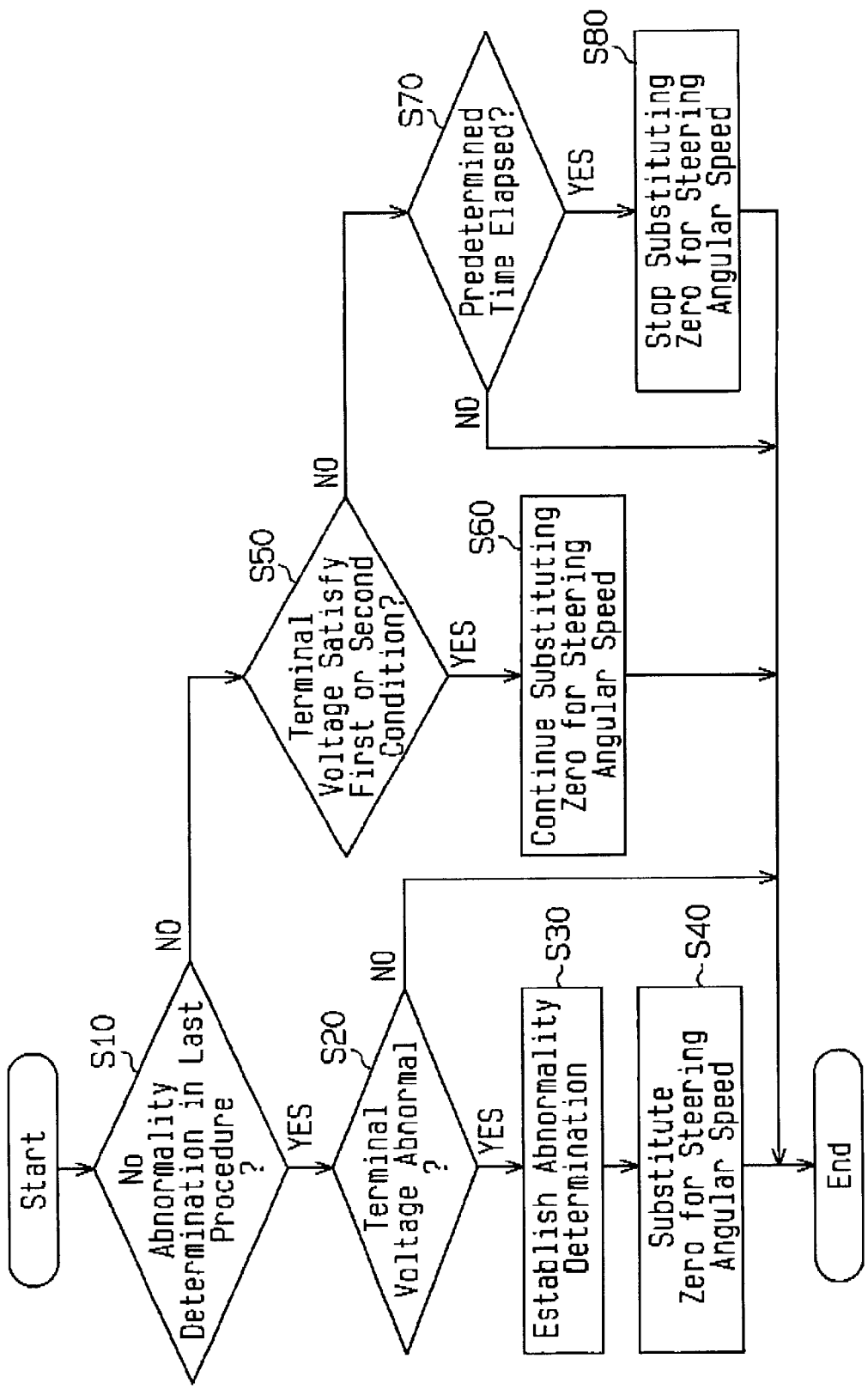
FIG. 3 is a flowchart of a steering wheel angular velocity determination program executed by the CPU shown in FIG. 2.

FIG. 3 is a flowchart showing an angular velocity determination program executed by the CPU 21 to determine the steering wheel angular velocity Qs at the second to fourth calculator 32 to 34. The angular velocity determination program is repeatedly executed at an interval of several milliseconds.

In step 10, the CPU 21 determines whether an abnormality was determined in the last execution of the angular velocity determination program by referring to an abnormality determination flag. That is, the CPU 21 determines whether the terminal voltages M1, M2 of the electric motor 6 had an abnormality in the last execution of the angular velocity determination program. The abnormality determination flag is set to zero if it is determined that there was no abnormality in the last execution of the angular velocity determination program, and is set to one if it is determined that there was an abnormality. When the abnormality determination flag is zero, the CPU 21 proceeds to step 20. When the abnormality determination flag is one, the CPU 21 proceeds to step 50.

In step 20, the CPU 21 determines whether the terminal voltages M1, M2 have satisfied the first condition of the second condition over a predetermined time. In other words, the CPU 21 determines whether the terminal voltages M1, M2 are abnormal.

When the terminal voltages M1, M2 satisfy the first condition or the second condition, the CPU 21 increments a count number T1 of a first timer. Regardless of the terminal voltages M1, M2, the CPU 21 increments a count number T2 of a second timer. The CPU 21 computes the ratio of the count number T1 of the first timer to the sum of the first count number T1 and the count number T2 of the second timer (T1/(T1+T2)). When the terminal voltages M1, M2 satisfy the first condition or the second condition, and the ratio of the count number T1 is equal or more than a predetermined value, that is, when the terminal voltages M1 M2 are abnormal, the CPU 21 proceeds to step 30. In the other cases, that is, when the terminal voltages M1, M2 are normal, the CPU 21 temporarily terminates the angular velocity determination program.

When the count number T1 reaches a predetermined upper limit value, the CPU 21 resets the count number T1 of the first timer and the count number T2 of the second timer to zero. The upper limit value is set greater than the control cycle of the angular velocity determination program.

In step 30, the CPU 21 sets the abnormality determination flag to one. As a result, it is determined that there is an abnormality. Thereafter, the CPU 21 proceeds to step 40.

In step 40, the CPU 21 substitutes zero for the steering wheel angular velocity Qs, which is sent to the second to fourth calculators 32 to 34 from the second estimator 39. Then, the CPU 21 temporarily terminates the angular velocity determination program.

In step 50, the CPU 21 determines whether the terminal voltages M1, M2 satisfy the first condition or the second condition. If the terminal voltages M1, M2 satisfy the first condition or the second condition, the CPU 21 proceeds to step 60. If the terminal voltages M1, M2 satisfy neither of the first condition or the second condition, the CPU 21 increments a count number T3 of a third timer and proceeds to step 70.

In step 60, the CPU 21 temporarily terminates the angular velocity determination program while continuing the process for substituting zero for the steering wheel angular velocity Qs, which was determined at the second to fourth calculators 32 to 34 in the last execution of the angular velocity determination program.

In step 70, the CPU 21 determines whether the count number T3 of the third timer is equal to or more than a predetermined time. The count number T3 represents the time elapsed while no abnormality of the terminal voltages M1, M2 are detected. When the count number T3 is equal to or more than the predetermined time, the CPU 21 proceeds to step 80. When the count number T3 is less than the predetermined time, the CPU 21 temporarily terminates the angular velocity determination program.

In step 80, the CPU 21 stops the process for substituting zero for the steering wheel angular velocity Qs, which was determined at the second to fourth calculators 32 to 34 in the last execution of the angular velocity determination program. The CPU 21 sets the abnormality determination flag to zero and resets the count number T3 of the third timer to zero. Then, the CPU 21 temporarily terminates the angular velocity determination program.

Figure 4:
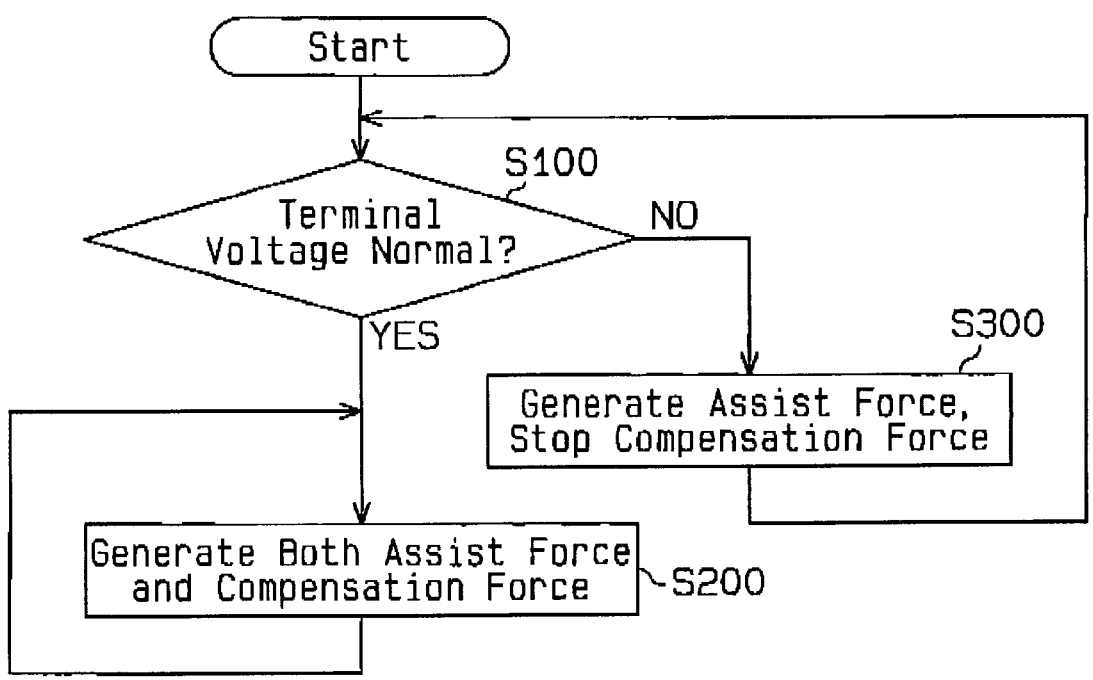
FIG. 4 is a flowchart of a control program related to the generation of assist force and compensation force executed by the CPU shown in FIG. 2.

FIG. 4 is a flowchart of a control program related to the generation of the assist force and the compensation force. The program of FIG. 4 is executed by the CPU 21. This control program is periodically executed.

In step 100, the CPU 21 determines whether the terminal voltages M1, M2 of the electric motor 6 are normal by judging whether the abnormal signal α is inputted in the second to fourth calculator 32 to 34. When the abnormality signal α is not inputted, the CPU 21 proceeds to step 200. When the abnormality signal α is inputted, the CPU 21 proceeds to step 300.

In step 200, the CPU 21 executes the program related to the generation of the assist force and the program related to the generation of the compensation force as usual.

In step 300, the CPU 21 stops the program related to the generation of the compensation force, and executes only the program related to the generation of the assist force. In this case, the generation of the compensation force is not stopped by stopping the operation of the second to fourth calculators 32 to 34, which are related to the generation of the compensation force. Instead, the generation of the compensation force is stopped by substituting zero for the steering wheel angular velocity Qs, which is inputted in the second to fourth calculators 32 to 34, thereby setting the compensation current command values Ih*, Id*, If* to zero.

This embodiment provides the following advantages.

Even if the terminal voltages M1, M2 are abnormal, the control apparatus 20 sends a signal representing the result of computation at the PWM calculator 37 to the driving device 24 so that the driving device 24 drives the electric motor 6. Thus, even if the terminal voltages M1, M2 are abnormal, the electric motor 6 generates the assist force. As a result, the steering force of the steering wheel 1 continues being reduced.

When the terminal voltages M1, M2 are abnormal, zero is substituted for the steering wheel angular velocity Qs, which is supplied to the second to fourth calculator 32 to 34 from the second estimator. Accordingly, the return current command value Ih*, the damper current command value Id*, and the friction compensation current command value If* are fixed to zero. Thus, deterioration of the steering feeling due to invalid compensation current command values is minimized.

In the steering wheel angular velocity determination program, the CPU 21 measures the time elapsed while no abnormality of the terminal voltages M1, M2 is detected. Only when the elapsed time is equal to or more than a predetermined time, the CPU 21 determines that the terminal voltages M1, M2 are normal and stops substituting zero for the steering wheel angular speed Qs. Thus, recovery of the terminal voltages M1, M2 is accurately determined without being affected by noises.

The above embodiment may be modified as follows.

Although, in the illustrated embodiment, if the terminal voltages M1, M2 are abnormal, the return current command value Ih*, the damper current command value Id*, and the friction compensation current command value If* are set to zero, the command value need not be set to zero. However, to minimize the deterioration of the steering feeling due to invalid compensation current command values, the command values are most preferably set to zero and are preferably set to values close to zero.

In the illustrated embodiment, if the terminal voltages M1, M2 are abnormal, zero is substituted for the steering wheel angular velocity Qs. However, a value other than zero may be substituted for the steering wheel angular velocity Qs.

That is, the steering wheel angular velocity Qs may be substituted by a value other than zero as long as the value corresponds to zero of the return current Ih on the steering wheel return current map, to zero of the damper current Id on the damper current map, and to zero of the friction compensation current If on the friction compensation current map.

One or two of the second to fourth calculators 32 to 34 may be omitted. That is, the control motor 6 may be generate only one or two of the steering wheel return force, the damper force, and the compensation force as the compensation force.

In the illustrated embodiment, the first calculator 31 calculates the assist current command value I based on the steering torque Th and the vehicle speed V. However, the first calculator 31 may calculate the assist current command value I based only on the steering torque Th. Alternatively, the first calculator 31 may calculate the assist current command value I based the engine speed and the steering torque Th.

Therefore, the present examples and embodiments are to be considered as illustrative and not restrictive and the invention is not to be limited to the details given herein, but may be modified within the scope and equivalence of the appended claims.

What is claimed is:

1. An apparatus for controlling an electric power steering system located between a steering wheel and a steered vehicle wheel, wherein the electric power steering system includes a motor, and wherein the motor generates assist force for reducing steering force of the steering wheel and compensation force for compensating for movement of the steering wheel, the apparatus comprising:
    first calculation means for calculating an assist current command value that corresponds to the assist force based on the steering torque of the steering wheel;
    second calculation means, wherein the second calculation means estimates the angular velocity of the steering wheel based on a terminal-to-terminal voltage of the motor and calculates a compensation current command value that corresponds to the compensation force based on the estimated steering wheel angular velocity;
    control means for controlling the motor based on the sum of the assist current command value and the compensation current command value; and
    detection means for detecting an abnormality of a terminal voltage of the motor, wherein, when an abnormality of the terminal voltage is detected, the second calculation means substitutes a predetermined fixed value for the steering wheel angular velocity and then calculates the compensation current command value.

2. The apparatus according to claim 1, wherein the control means controls the motor based on the sum and the value of the current that flows through the motor.

3. The apparatus according to claim 1, wherein the fixed value is zero.

4. The apparatus according to claim 1, wherein the fixed value is capable of setting the compensation current command value, which is calculated based on the fixed value, to zero.

5. The apparatus according to claim 1, wherein the compensation force includes force for assisting the steering wheel to automatically return to a neutral position.

6. The apparatus according to claim 1, wherein the compensation force includes force for improving the convergence of the steering wheel to a neutral position when the steering wheel automatically returns to the neutral position.

7. The apparatus according to claim 1, wherein the compensation force includes force for compensating for load generated due to friction in a transmission path of steering force between the steering wheel and the steered vehicle wheel.

8. The apparatus according to claim 1, wherein, after a predetermined time has elapsed without detection of an abnormality, the second calculation means returns to the procedure for estimating the steering wheel angular velocity based on the terminal-to-terminal voltage of the motor.

9. An apparatus for controlling an electric power steering system located between a steering wheel and a steered vehicle wheel, wherein the electric power steering system includes a motor, and wherein the motor generates assist force for reducing steering force of the steering wheel and compensation force for compensating for movement of the steering wheel, the apparatus comprising:
    first calculation means for calculating an assist current command value that corresponds to the assist force based on the steering torque of the steering wheel;
    second calculation means, wherein the second calculation means estimates the angular velocity of the steering wheel based on a terminal-to-terminal voltage of the motor and calculates a compensation current command value that corresponds to the compensation force based on the estimated steering wheel angular velocity;
    a control means, wherein the control means controls the motor based on the difference between the value of a current that flows through the motor and the sum of the assist current command value and the compensation current command value; and
    detection means for detecting an abnormality of a terminal voltage of the motor, wherein, when an abnormality of the terminal voltage is detected, the second calculation means substitutes zero for the steering wheel angular velocity and then calculates the compensation current command value.

10. A method for controlling an electric power steering system located between a steering wheel and a steered vehicle wheel, wherein the electric power steering system includes a motor, and wherein the motor generates assist force for reducing steering force of the steering wheel and compensation force for compensating for movement of the steering wheel, the method comprising:
    calculating an assist current command value that corresponds to the assist force based on the steering torque of the steering wheel;
    estimating the angular velocity of the steering wheel based on a terminal-to-terminal voltage of the motor, and calculating a compensation current command value that corresponds to the compensation force based on the estimated steering wheel angular velocity;
    controlling the motor based on the sum of the assist current command value and the compensation current command value;
    detecting an abnormality of a terminal voltage of the motor; and
    substituting a predetermined fixed value for the steering wheel angular velocity when an abnormality of the terminal voltage is detected.

11. The method according to claim 10, wherein the motor is controlled based on the sum and the value of the current that flows through the motor.

12. The method according to claim 10, wherein the fixed value is zero.

13. The method according to claim 10, wherein the fixed value is capable of setting the compensation current command value, which is calculated based on the fixed value, to zero.

14. The method according to claim 10, wherein the compensation force includes force for assisting the steering wheel to automatically return to a neutral position.

15. The method according to claim 10, wherein the compensation force includes force for improving the convergence of the steering wheel to a neutral position when the steering wheel automatically returns to the neutral position.

16. The method according to claim 10, wherein the compensation force includes force for compensating for load generated due to friction in a transmission path of steering force between the steering wheel and the steered vehicle wheel.

17. The method according to claim 10, further comprising returning to the procedure for estimating the steering wheel angular velocity based on the terminal-to-terminal voltage of the motor after a predetermined time has elapsed without detection of an abnormality.

18. A method for controlling an electric power steering system located between a steering wheel and a steered vehicle wheel, wherein the electric power steering system includes a motor, and wherein the motor generates assist force for reducing steering force of the steering wheel and compensation force for compensating for movement of the steering wheel, the method comprising:

calculating an assist current command value that corresponds to the assist force based on the steering torque of the steering wheel;

estimating the angular velocity of the steering wheel based on a terminal-to-terminal voltage of the motor, and calculating a compensation current command value that corresponds to the compensation force based on the estimated steering wheel angular velocity;

controlling the motor based on the difference between the value of a current that flows through the motor and the sum of the assist current command value and the compensation current command value;

detecting an abnormality of a terminal voltage of the motor; and substituting zero for the steering wheel angular velocity when an abnormality of the terminal voltage is detected.

* * * * *